United States Patent [19]

Viola

[11] 4,258,942

[45] Mar. 31, 1981

[54] THREADED FERRULE HOSE COUPLING

[75] Inventor: Frank J. Viola, Uniondale, N.Y.

[73] Assignee: Ideal Corporation, Brooklyn, N.Y.

[21] Appl. No.: 42,573

[22] Filed: May 25, 1979

[51] Int. Cl.³ .................................................. F16L 33/22
[52] U.S. Cl. ........................................ 285/245; 285/259
[58] Field of Search ................. 285/245, 255, 242, 40, 285/251, 259

[56] References Cited

U.S. PATENT DOCUMENTS

| | | | |
|---|---|---|---|
| 1,064,154 | 6/1913 | Miller | 285/255 |
| 1,263,557 | 4/1918 | Hilton | 285/251 X |
| 2,029,846 | 2/1936 | Von Henke | 285/251 |
| 2,965,395 | 12/1960 | Schmohl et al. | 285/40 |
| 4,079,966 | 3/1978 | Berry et al. | 285/40 |

FOREIGN PATENT DOCUMENTS 684421 4/1964 Canada .................................... 285/245

2510218 11/1975 Fed. Rep. of Germany ........... 285/255

*Primary Examiner*—Thomas F. Callaghan
*Attorney, Agent, or Firm*—Albert C. Johnston

[57] ABSTRACT

A coupling device fitted onto an end of a hose into which a barbed nipple is inserted. The device is a rigid ferrule providing along its inner side two cylindrical portions of different diameters that are joined by a frusto-conical portion. The ferrule has a spiral thread of constant pitch formed on and along the inner side of all the portions. The thread in the larger cylindrical portion presses a shallow mating thread into the outside surface of the hose and initially advances the ferrule along the hose. The thread in the frusto-conical portion presses a progressively deepening thread into the hose and increasingly radially contracts the hose into the voids between the nipple barbs. The thread in the smaller cylindrical portion holds the hose contracted into the voids.

8 Claims, 8 Drawing Figures

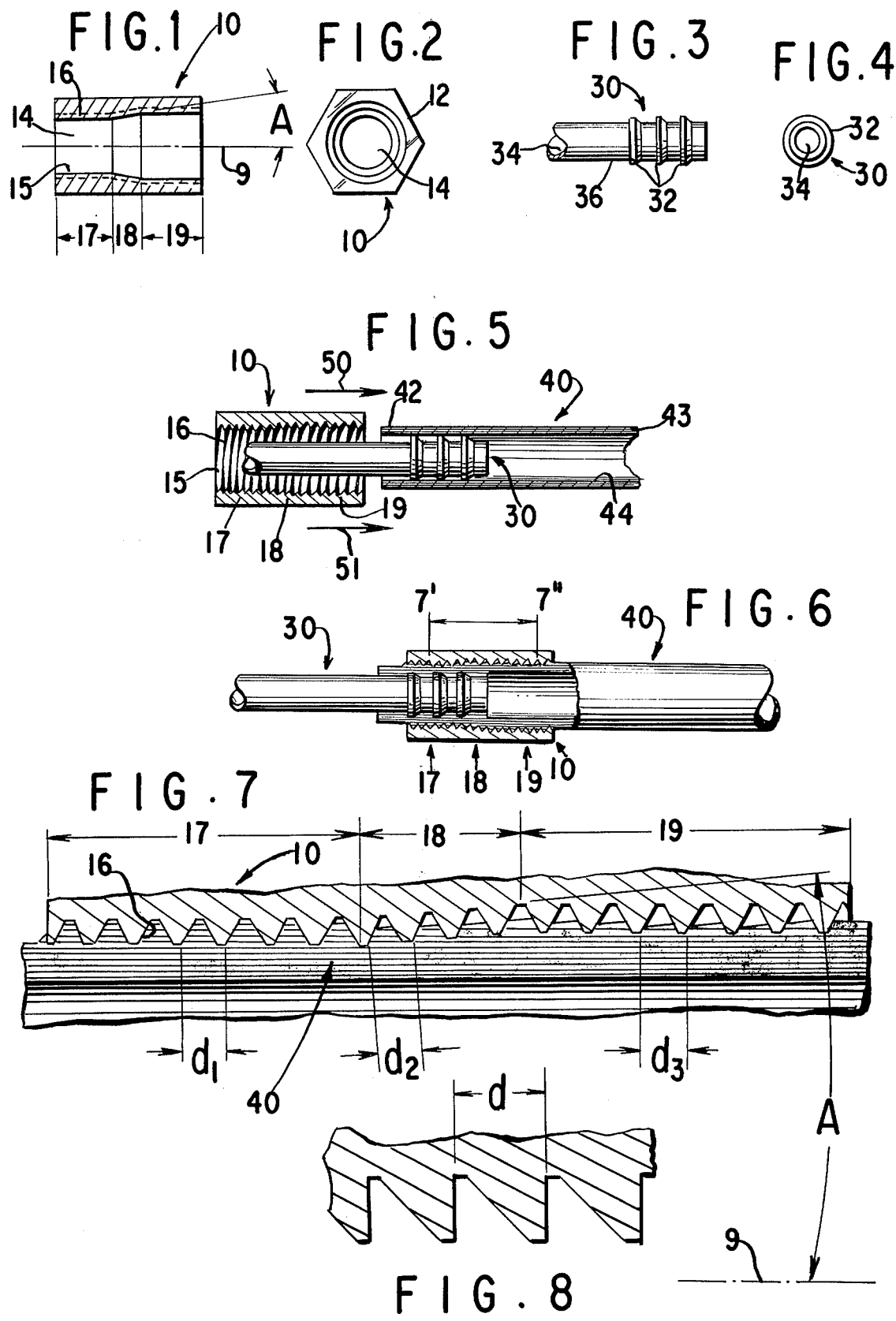

THREADED FERRULE HOSE COUPLING

This invention relates to a coupling device for joining a hose to a nipple inserted into one end of the hose to form a fluid-tight seal.

Hose is used as a conduit for many kinds of fluids. With the advent of synthetic materials such as polyurethane and nylon, multi-layer plastic hose is increasing in popularity. Such hose typically consists of an outer polyurethane cover fitted over an intermediate Kelvar braid which overlies an inner nylon tubing. The ends of multilayer hoses are coupled to each other or to other fittings by means of insertable nipples which have a plurality of axially spaced projections or barbs for engaging the inner nylon tubing. The barbs can be embedded in the nylon tubing by means of a screw-type hose clamp. Such a clamp may be fitted onto the outer layer of the hose over the section covering the barbs. As the screw is tightened, the clamp radially contracts the hose into the space between the barbs of the nipple. However, such clamps require a great deal of force in order to contract the hose into the spaces between the barbs.

Others have proposed to couple and seal a hose end onto a barbed nipple by means of a ferrule having an inner threaded surface of constant diameter, or by a ferrule having a threaded portion of constant diameter merging into a tapered threaded portion of constantly decreasing diameter. A ferrule of the latter type will apply maximum sealing force only at the nipple barb closest to the small end of the taper. A ferrule of the former type either has to be factory installed or requires special tools for installation due to the large forces required for threading a uniform diameter ferrule over a hose inserted with a barbed nipple. Hence, there remains a need for a reliably sealing hose coupling which can be readily installed with ordinary tools in its operating environment.

Examples of known types of ferrules may be found in U.S. Pat. Nos. Re. 18,840; 2,248,576; 2,290,067; 2,782,059; 3,032,358 and 3,143,020 and Canadian patent 684,421. Such examples include ferrules having a tapered, internal thread, flared and threaded ferrules, ferrules having stepped, internal thread arrangements, ferrules having one or more threads that travel in opposite directions, and ferrules having threads of variable pitch.

It is an object of this invention to provide a new and improved coupling device.

It is another object to provide a threaded ferrule hose coupling which can be installed with simple tools in the operating environment of the hose and will hold and seal the hose securely onto a barbed nipple inserted into the end of the hose.

SUMMARY

The foregoing objects as well as others are achieved by the present invention which provides a coupling device comprising a rigid ferrule having two cylindrical portions of different diameters joined together by a frusto-conical portion and having a spiral thread of constant pitch formed on and along the inner side of all said portions. The pitch or distance between thread turns is constant throughout the length of the ferrule. Such a constant pitch thread presses a continuous spiral mating thread into a hose. After a starting mating thread is pressed into the hose by the thread along the inner surface of the larger cylindrical portion, the thread in the subsequent portions will follow along the same mating thread and press a deepening, holding thread into the hose.

The ferrule of the invention will clamp a hose to a nipple to form a fluid-tight seal along all the barbs of the nipple. A barbed nipple is inserted into an end of a hose and the ferrule is passed over the nipple with the larger cylindrical portion of the ferrule facing the hose. The larger cylindrical portion aligns the ferrule with the hose and the thread in the larger portion presses a shallow, starting thread into the outer surface of the hose. As the ferrule is turned the starting thread provides an axial thrust to the ferrule for advancing it along the hose. As the sloped or frusto-conical portion engages the hose, the thread in that portion progressively cuts a deepening thread into the hose and increasingly radially contracts the hose into the space between the barbs of the nipple. As the ferrule is finally turned, the smaller cylindrical portion engages the hose. The thread in the small portion holds the hose contracted in the space between the barbs.

In the preferred embodiment, the larger cylindrical portion has an axial length amounting to at least about as long as one-half the outside hose diameter. The length of the frusto-conical portion will vary, depending upon its angle of convergence. That angle is preferably between 1° to 20° as measured between the threaded inner surface and the axis of the ferrule. The smaller cylindrical portion is of sufficient length to span all the barbs of the nipple.

The ferrule is also provided with a suitable outer surface to assist its installation onto a hose. The outer surface may be hex-shaped or alternatively rounded and having wrench flats, ribs, or a gnarled surface to receive a turning moment and transmit such a moment to the ferrule.

One advantage of the invention is the starting thread in the larger cylindrical portion. Such a starting thread is desirable when installing the ferrule on hose in hard-to-reach places where it is difficult to apply large axial forces to start a mating thread. The thread in the frusto-conical portion is progressively deeper along its axial length for increasingly pressing the hose into the space between the nipple barbs. The thread in the smaller diameter portion holds the hose tightly contracted into that space.

The foregoing advantages are obtained by using a spiral thread that is preferably rounded at its crest in order not to cut the hose yet sharp enough to facilitate axial movement of the ferrule along the hose. The thread diameter is made sufficiently large in the larger portion to start the axial movement and small enough in the smaller portion to minimize voids or air spaces. The latter prevents the hose material from slipping or cold flowing from underneath the thread.

DRAWINGS

FIG. 1 is a partial sectional view of a proferred ferrule having the three internal surface portions of larger, smaller, and tapered intermediate diameters.

FIG. 2 is an end view of the ferrule showing a hexagonal outer surface.

FIG. 3 is a partial view of a nipple having a plurality of circumferential projections (barbs) on its outer surface.

FIG. 4 is an end view of the nipple of FIG. 3.

FIG. 5 is a sectional view of a threaded ferrule which is about to be installed on an end portion of a hose into which a barbed nipple has been inserted.

FIG. 6 is similar to FIG. 5 and shows the ferrule installed on the hose.

FIG. 7 is an expanded, partial sectional view of the internal surface of the ferrule of FIG. 6 taken along the section designated 7'-7''.

FIG. 8 is a partial, typical section of the internal, threaded surface of a ferrule having a buttress thread.

DETAILED DESCRIPTION

Turning now to the drawings and in particular FIG. 1, there is shown a rigid ferrule 10 of the invention. Ferrule 10 has a longitudinal bore 14 which has an inner surface 15 that extends through three portions 17–19 of the ferrule 10. The internal surface 15 is adapted to be cut to carry a spiral thread 16 of constant pitch as will be explained hereinafter. The three portions 17–19 include at one end a cylindrical portion 17 having a constant diameter along the axial length thereof. At the other end of ferrule 10 is cylindrical portion 19 which also has a constant diameter along its axial length. The diameter of the portion 19, is larger than the diameter of portion 17, so portion 19 is designated as the "larger" portion and 17 is designated as the "smaller" portion.

The two cylindrical end portions 17 and 19 are joined together by frusto-conical portion 18. Frusto-conical portion 18 is sloped at any suitable angle, A, which is measured between the ferrule's axis 9 and the inner surface 15. The angle A is preferably not less than 1° and not greater than 20°. The diameter of frusto-conical portion 18 progresses from the larger diameter of portion 19 to the smaller diameter of portion 17. Thus, the ferrule 10 has an internal bore 14 that extends through two portions of different but constant diameters and an intermediate frusto-conical shaped portion of tapering diameter.

The outside surface 12 of ferrule 10, as shown in FIG. 2, is hexagonal in shape and thus adapted for manipulation by a suitable tool such as a wrench (not shown).

Turning now to FIG. 5, the ferrule 10 is shown having an internal surface 15 which carries a screw thread 16 that has a constant pitch, i.e. axial crest-to-crest distance. The ferrule 10 is about to be installed onto a hose 40 which has a barbed nipple 30 inserted into an end portion 42 of hose 40. The details of the nipple 30 are particularly shown in FIG. 3. There, the nipple 30 has a generally cylindrical shape and includes an axial bore 34 through which fluids may pass. A plurality of circumferential projections or barbs 32 extend radially from the outer surface 36 of the nipple 30 as best shown in FIG. 4.

Returning now to FIG. 5, the nipple 30 is shown partially inserted into an end 42 of hose 40. The nipple barbs 32 press against inner wall 44 of hose 40. The ferrule 10 is shown about to be fitted over nipple 30 and hose 40 as indicated by arrows 50 and 51. The larger cylindrical portion 19 is presented to the hose 42. The diameter of end 19 is chosen in accordance with the outside diameter of the hose 40. Hence, the diameter of end 19 as measured from opposite crests of thread 16 is chosen to be suitably smaller than the outside diameter of hose 40 in order to press a corresponding relatively shallow starting thread into the outer surface of hose 40. Such an appropriate thread diameter of portion 19 serves to align the ferrule along the length of the hose end 42. The ferrule 10 is turned by means of a wrench fitted on the hexagonal shaped outer surface 12. The shallow thread in larger portion 19 is sufficiently deep to press a mating thread into the outer wall 43 of hose 40. Thus, as the ferrule 10 is turned, it axially advances along hose 40 until the frusto-conical portion 18 is presented to the end 42 of hose 40.

The frusto-conical portion 18 of ferrule 10 also carries on its inner side the constant pitch spiral thread 16. The thread 16 of portion 18 presses a progressively deeper mating thread into the outer wall 43 of hose 40, and thereby radially contracts the hose 40 onto the nipple 30. Hence, the hose lying inside portion 18 is forced into the space between the barbs 32 of nipple 30 and thereby provides a fluid-tight seal.

After the frusto-conical portion 18 is fully threaded onto the hose 40, the other or smaller cylindrical portion 17 of ferrule 10 is presented to hose 40. Like portions 18 and 19, portion 17 carries the same, constant pitch spiral thread 16 on its inner surface 15. As the ferrule 10 is turned, smaller portion 17 is axially advanced along the hose 40. Due to the relatively small diameter of portion 17, the thread 16 in portion 17 presses relatively deeply into the hose 40 along the section of hose 40 lying within portion 17. When the ferrule is finally installed, a substantial contracting force is exerted on the hose 40 that lies inside portion 17, and that force acts to hold the ferrule 10, hose 40 and the nipple 30 in a fluid-tight relationship. Accordingly, portion 17 resists the tendency of the hose 40 to cold flow between threads or otherwise disengage the ferrule 10 from its installed, sealing position as shown in FIG. 6.

The lengths of the ferrule 10 and of its portions 17–19 may be chosen by those skilled in the art to accommodate the particular hose 40 and nipple 30 contemplated. In the preferred embodiment, the length (FIG. 7) of the larger diameter portion 19 is chosen to be at least as long as one-half the outside diameter of the hose 40, and preferably, is as long as that outside diameter. As mentioned above, the sloped portion 18 converges at an angle A measured relative to the axis of the ferrule 10. That angle A may be as small as 1° and as large as 20°, depending upon the thickness of and diameter of the wall of the hose 40. The length of the smaller portion 17 is chosen to be long enough to span all the barbs 32 of the nipple 30.

The thread 16 of FIG. 7 is an American National-Unified type thread. Alternatively, a buttress type thread (FIG. 8) may be used, as well as Acme or knuckle threads types (not shown). Whichever thread is chosen, the pitch, d, or crest-to-crest distance remains a constant throughout the length of the ferrule 10. The latter enables an operator to easily install the ferrule 10 on site, even in places where access is limited. The thread 16 is preferably only sharp enough to facilitate the axial thrust needed to advance the ferrule 10 along the hose 40. Also, the thread 16 is deep enough (i.e. the diameter of portion 17 is small enough) to minimize the voids or air spaces between adjacent barbs 32 and thus prevent the hose 40 from slipping or cold flowing from underneath the thread 16, but not so deep as to sever the hose 40.

In the preferred embodiment, the ferrule 10 is made from a rigid material, such as aluminum or an alloy such as brass or steel. The ferrule 10 may also be made out of any suitable rigid synthetic material, such as plastic, depending upon the strength of material needed for the ferrule 10. Likewise, it is contemplated that the nipple 10 is made out of aluminum and that the hose 40 is of a layered construction having an inner nylon core, an intermediate Kevlar braid, and an outer polyurethane jacket.

For example, a hose 40 of the type described above may have an outside diameter of 0.53 inches and an inside diameter of 0.36 inches. Such a hose 40 is fitted with a nipple 30 which has an outside diameter of 0.31 inches and three circumferential barbs 32 having a diameter of 0.37 and spaced axially along approximately 0.5 inch of the outer surface 36 of nipple 30. The hose 40 is flexible enough so that the barbs 32 may be forced into the end 42 as shown in FIG. 6.

A suitable rigid ferrule 10 of aluminum, steel or brass would have an overall length of 1.25 inches. The diameter of portion 19 would be 9/16 inches and portion 19 would axially extend 0.5 inches. The other end portion 17 would have a 0.5 inches diameter and likewise axially extend 0.5 inches. The tapered portion would be approximately 0.25 inches long. The pitch of the thread 16 would be uniform through the portions 17-19, at approximately 14 crests/inch, or 0.0714. The preferred range for the pitch varies between 10 to 16 crests/inch or 0.1 to 0.06.

It is to be understood that the invention is not limited to the details mentioned above and shown on the drawings and that various modifications may be effected therein without departing from the spirit and scope of the invention.

What is claimed is:

1. A coupling device for joining an end portion of a hose to a nipple that is inserted into said hose, said nipple having on its outer side a set of axially spaced projections for engaging the inner wall of said hose, said device comprising a rigid ferrule providing along its inner side two cylindrical portions of different diameters joined together by a frusto-conical portion and having a spiral thread of constant pitch formed on and along the inner side of all said portions, whereby upon turning said ferrule onto a hose fitted with a nipple, the thread in the larger of said cylindrical portions presses a mating thread into the hose and axially advances said ferrule along the hose, after which the thread in said frusto-conical portion deepens said mating thread and radially contracts the hose into the space between projections of the nipple, and the thread in the smaller of said cylindrical portions holds the hose contracted into said space.

2. The coupling device of claim 1, said frusto-conical portion being sloped at an angle to its axis of at least 1° but not greater than 20°.

3. The coupling device of claim 1, said smaller cylindrical portion having an axial length sufficient to span all the projections of the nipple.

4. The coupling device of claim 1, the axial length of said larger cylindrical portion amounting to at least about one-half the outside diameter of the hose.

5. The coupling device of claim 1, the axial length of said larger cylindrical portion being approximately equal to the outside diameter of the hose.

6. The threaded ferrule of claim 1 wherein the pitch of said thread is at least 0.06 inch but not greater than 0.10 inch.

7. A coupling device for joining an end portion of a hose to a nipple that is inserted into said hose, said nipple having on its outer side a set of axially spaced projections for engaging the inner wall of said hose, said device comprising a rigid ferrule providing along its inner side two cylindrical portions of different diameters, the larger cylindrical portion having an axial length amounting to at least about one-half the outside diameter of the hose and the smaller cylindrical portion having an axial length sufficient to span the projections of the nipple, said two portions being joined together by a frusto-conical portion sloped at an angle to its axis of at least 1° but not greater than 20°, all said portions having formed on and along their inner side a screw thread having a constant pitch in the range of about 0.06 to 0.10 inch whereby upon turning said ferrule onto a hose fitted with a nipple, said thread in the larger of said cylindrical portions presses a mating thread into the hose and axially advances said ferrule along the hose, after which said thread in said frusto-conical portion deepens said mating thread and radially contracts the hose into the space between projections on the nipple, and said thread in the smaller of said cylindrical portions holds the hose contracted into said space.

8. The coupling device of claim 7, the axial length of said larger cylindrical protion being approximately equal to the outside diameter of the hose.

* * * * *